SWINGABLY SUPPORTED TELEPHONE BOOK BINDERS

Filed Aug. 19, 1957

INVENTOR.
James P. Guinane
BY D. Stephen Baker
ATTORNEY

United States Patent Office 2,856,728

Patented Oct. 21, 1958

2,856,728

SWINGABLY SUPPORTED TELEPHONE BOOK BINDERS

James P. Guinane, New York, N. Y., assignor to Herculox Loose Leaf Corp., New York, N. Y., a corporation of New York Application August 19, 1957, Serial No. 678,916

7 Claims. (Cl. 45—85)

This invention relates to book binders or holders as used in telephone book stands where one or more telephone books are pivotally supported in a structure for convenient consultation and maintenance. This application is a continuation-in-part of a prior application Serial No. 591,760, filed June 15, 1956, by myself and Raymond F. Batchelar, as joint inventors.

As is pointed out in the prior application, structures for maintaining telephone books where they can be swung up into a reading position, or lowered into a normal or rest position, have been known and are in wide usage. However, the book binders or holders used therein are generally unsatisfactory because they are not adaptable to the variety of different numbers and sizes of telephone books which must be accommodated in different sections of the country.

It will be understood that a telephone book for a small locality may be correspondingly small or thin relative to the conventional telephone books for large cities. Accordingly, such locality requires a telephone book binder of a different size. This can be accomplished, in part, by making the book binder variable in size so as to accommodate telephone books of varying sizes. It is essential however, that the structure which pivotally supports the binder be of fixed construction to avoid the necessity of providing special forms of supporting stands or structures for different parts of the country. Such a requirement would be unduly expensive and otherwise undesirable because it would not permit uniform maintenance practices.

It is further pointed out that telephone books generally have one or more holding rods which extend across the binder within the book so as to hold it in position. Generally, a telephone book will be deposited in a binder and the rods fixed in position. If the binder is variable in size, it can then be collapsed inwardly so as to firmly grasp the telephone book. It will be recognized, however, that such action would be impossible if the book holding rods were to shift when the holder is thus collapsed. In other words, there is no room for the book holding rods to shift since they are snugly retained within the telephone book.

In accordance with the above, I have devised a simplified form of book binder which is variable in capacity. However, such variation does not affect the hinged or pivoted connection to the supporting stand so that one form of supporting stand will support telephone book binders regardless of the variation of capacity. The same binder also supports holding rods, the position of which is independent of the binder variation in capacity. All this has been accomplished by employing a pair of outwardly slidable plates having locking means whereby a telephone book may be securely grasped and maintained therein. At the same time a fixed plate is secured to the slidable plates. This fixed plate has upper and lower attachments which support one or more holding rods on one end, and which have a hinge connection on the other end. Accordingly, the rod holding element and the hinge element remain fixed relative to the slidable plates. This provides the advantages set forth above.

The invention will be further understood from the following description and drawings in which.

Figures 1, 2, 3, 4, 5, 6:
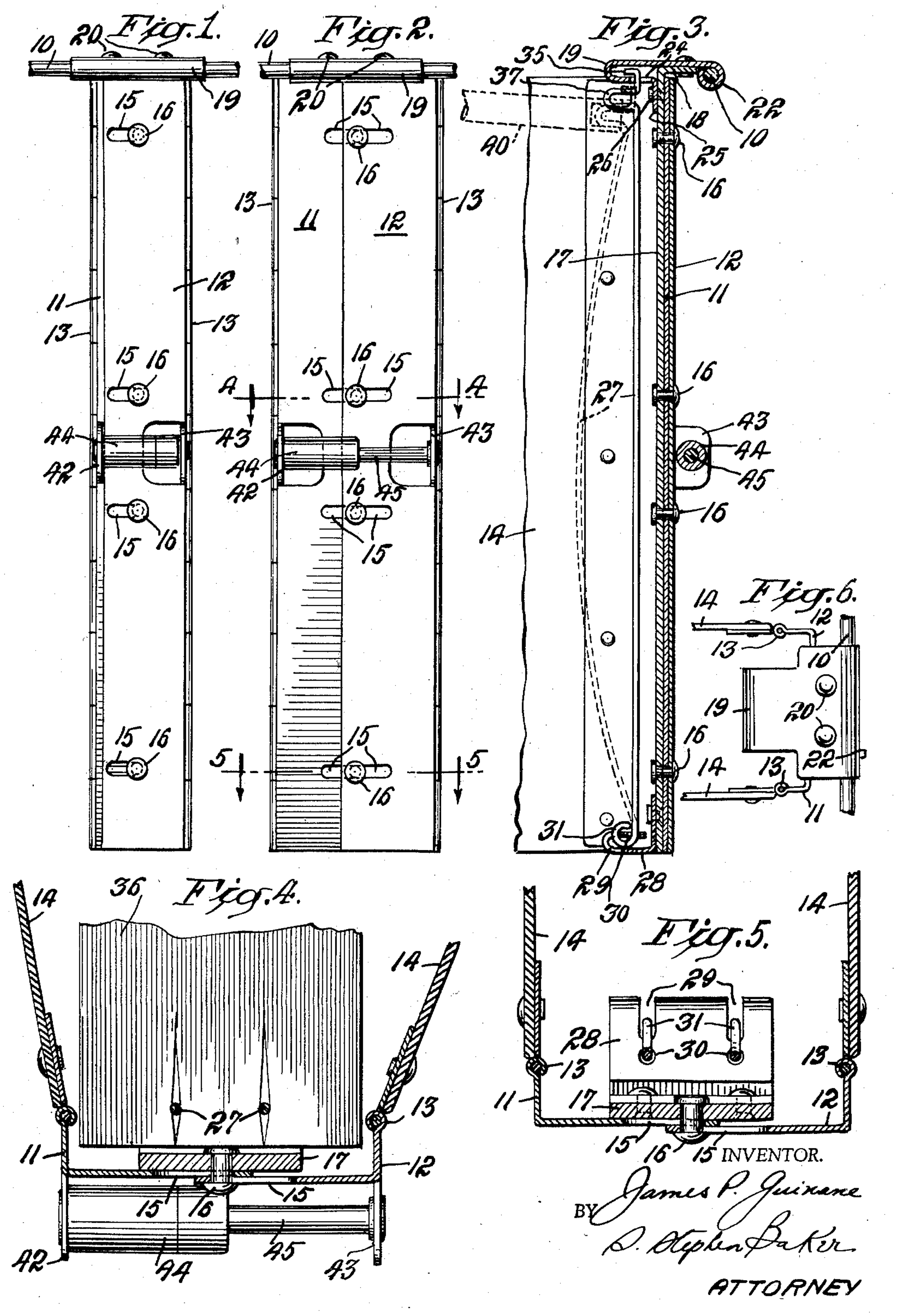
Figure 1 is a rear elevational view of a telephone book binder constructed according to the instant invention and shown in a collapsed or fully inward condition.
Figure 2 is a similar view with the binder shown in the fully expanded position.
Figure 3 is a longitudinal, central cross-sectional view through the binder.
Figure 4 is an enlarged cross-sectional view as taken along the line 4—4 of Figure 2.
Figure 5 is an enlarged cross-sectional view as taken along the line 5—5 of Figure 2.
Figure 6 is a fragmentary top plan view.

The binder is used in a telephone book supporting stand or structure which includes fixed chambers or receptacles each of which swingably receives one book binder as is conventional and not shown herein. This chamber is provided at its rear end with a transverse rod 10 which swingably supports the binder. As will be shown hereinafter, the improved binder embodies a simple structure for permitting it to swing on rod 10 while at the same time performing other functions.

First, it may be observed that the binder is expansible for the purpose of accommodating different sizes and numbers of telephone books. Thus, the binder comprises a pair of outwardly slidable angle plates 11 and 12 to each of which are hinged at 13, the side covers 14 of the binder.

Plates 11 and 12 slide over each other telescopically, the limits thereof being determined by slots 15 formed in both slidable plates in conjunction with studs or rivets 16 which hold the plates loosely so as to permit such sliding. However, the plates are maintained in a set position by virtue of a locking device such as will be explained hereinafter.

The binder includes a rearward, centrally disposed plate 17 which is fixed in position, lying parallel to plates 11 and 12, the studs or rivets 16 going simply through holes therein instead of slots. Fixed plate 17 is substantially of the same length as slidable plates 11 and 12 which overlie said fixed plate. However, at its upper end it is formed with a rearwardly off-set extension 18 which supports transverse bracket 19.

Bracket 19 is the element that adapts fixed plate 17 to both a binder pivoting and rod holding function. In other words, the simple employment of the transverse bracket 19 on the top end of the fixed plate 17 permits the binder to be swingably supported in the telephone book stand and at the same time makes provision for the connection of holding rods which will be embraced within the telephone book. Inasmuch as plate 17 is fixed relative to the binder, the pivoting structure as well as the rod holding structure which are supplied by the bracket 19, will likewise remain fixed regardless of the variation in capacity of the binder. Accordingly, the binder will be usable in stands for conventional construction and will fit therein regardless of whether the binder is extended or not. Likewise, the holding rods, as will be explained hereinafter, will remain fixed in position notwithstanding variation in binder capacity.

Bracket 19 is connected to off-set extension 18 by means of the rivets 20. Such connection forms a T-shaped structure of the fixed plate 17 and the transverse bracket 19. On one side of bracket 19 is a downwardly curled hinge arm 22 in conjunction with which the rod 10 serves as a hinge pin. In actual practice, the rod 10 is slipped through the tubular hinge arm 22 so as to swingably support the binder in the stand. The other side of bracket 19 is bent rearwardly to form arch or U 23 which is provided at its inner arm with vertical slot 24 and then formed with a flange 25 which permits its connection as by rivets 26 directly to the fixed plate 17. Tne connection of bracket 19 by both rivets 20 and 26 so strengthens the structure as to permit heavy telephone books to be securely suspended from the supporting stand. Slot 24 serves to removably engage a holding rod 27 as will hereinafter be described. One or more slots may be provided so as to accommodate a corresponding number of holding rods, the drawings in this particular case showing two such rods.

The lower end of fixed plate 17 is provided with means to swingably support the holding rods 27. Such means comprise a lower bracket 28 the end portion of which is of arched or inverted U-shape as illustrated in Figure 3. Across the top or bridge end of the arched or inverted U-shaped bracket 28 are formed slots 29 which, in conjunction with openings 30, swingably engage the hinge end 31 of the holding rod 27.

Rods 27 are elongated and fabricated of a resilient steel. The upper end of each rod 27 is formed with an upwardly directed hook end 35 which is removably engaged by one of the slots 24 in order to lock the rod in position. It will be understood that the rods 27 are embraced within the pages of a telephone book 36 so as to hold the book in position as illustrated in Figure 4.

Immediately adjacent to and inward of the upper hook end 35 is an inverted U-shaped integral projection 37 which serves as a grasping and actuating member. In order to actuate the rod 27, a separate tool 40 is provided. In order to lock or unlock the rod 27 from slot 24, one end of tool 40 is applied over the projection 37, the tool having an open end which fits snugly over projection 37 for this purpose. As was explained in my above mentioned prior application, the tool is pressed downwardly over projection 37 and then flexed inwardly so as to bow the rod as illustrated in the broken lines of Figure 3. By this means the hook end 35 may be removed from the slot 24. The rod 27 may then be swung about the lower end projection 28 whereupon a telephone book may be removed or a new one locked in position.

As mentioned above, a locking device is provided for locking the binder in a fixed position where it firmly embraces the telephone book 36. The locking mechanism per se is not a part of this application it having been described in the above mentioned co-pending prior application. Furthermore, the essential action thereof is not basically new, its essentials having been described in U. S. Patent No. 1,869,790. In the instant application, the angle plates 11 and 12 are extended integrally downwardly to provide centrally disposed ears 42 and 43 which respectively support the male and female elements of the locking device. Thus female element 44 is connected to ear 42 and serves to grip male element 45 which is connected to ear 43.

Female element 44 comprises a socket which contains a ball carrier and a wedge portion in which steel balls are wedged. A spring normally urges the balls into the wedge so as to lock the device against outward movement. When the ball carrier is lifted upwardly against the action of the spring as by means of a special tool, the male element 45 is released. All this action is not illustrated because it is conventional and is described in the above mentioned patent as well as in the co-pending application Serial No. 591,760. Suffice it to say, however, that angle plates 11 and 12 may be slid inwardly without resistance until they embrace the enclosed book 36. This action takes place without in any way affecting the position of the holding rods 27 or the upper and lower brackets 19 and 28. Accordingly, the binder is made variable in width and capacity while the most simple additions to the fixed rear plate 17 provide book holding means and swingable binder supporting means all operating independently of the adjustability of the binder capacity. The plates 11 and 12, while freely slidable inwardly, are locked in such position against outward movement by the locking device described.

The binder may be expanded outwardly by employing the special tool above mentioned. When in an expanded condition, the holding rods may be disengaged and the book removed.

There has been shown what is now considered a preferred embodiment of the invention but it is obvious that changes and omissions may be made without departing from its spirit.

What is claimed is:

1. A book binder for use in a book supporting structure having books in binders swingably suspended from a hinge rod on said supporting structure, said binder comprising side covers, a fixed rearward plate, means on the upper end of said fixed plate for swingably supporting the binder from said hinge rod, at least one book holding rod on said binder, said holding rod being removably engaged by said means at the upper end of said fixed plate, a pair of mutually outwardly slidable plates overlying said fixed plate for varying the width and capacity of the binder and a two-piece locking member disposed rearwardly of said pair of slidable plates and having one of its two pieces connected to one slidable plate and the other to the other slidable plate.

2. A book binder according to claim 1 and wherein said means comprises a transverse bracket connected to the upper end of said fixed plate, one side of said transverse bracket being rolled to form a hinge arm and the other side of said transverse bracket having a vertical slot for removably engaging said holding rod.

3. A binder according to claim 2 and wherein said other side of said bracket is of inverted U-shape with said vertical slot being formed on the inner arm of the U.

4. A binder according to claim 3 and including a lower bracket secured to said fixed plate, said lower bracket being of inverted U-shape and having at least one slot formed across the bridge of the U, the inner arm of said lower bracket U being formed with an opening directly below its slot, the lower end of said holding rod being swingably connected to said lower bracket through said lower bracket opening and slot.

5. A binder according to claim 4 and wherein said transverse bracket forms a T with said fixed plate to which it is connected and a rearwardly off-set extension on the upper end of said fixed plate, said off-set extension being connected to said transverse bracket.

6. A book binder according to claim 5 and wherein said fixed plate is disposed forwardly of said outwardly slidable plates and lies parallel thereto.

7. A binder according to claim 4 and including an upward projection adjacent to the upper end of said holding rod for actuating said holding rod so as to engage or disengage it from said vertical slot, and an upwardly directed hook end at the extreme upper end of said holding rod and adjacent to said upward projection whereby actuation of said upward projection downwardly and inwardly will bow the rod and remove said hook end from said vertical slot.

References Cited in the file of this patent

UNITED STATES PATENTS

| | | |
|---|---|---|
| 1,053,862 | Paterson | Feb. 18, 1913 |
| 1,632,249 | Steenrod | June 14, 1927 |
| 1,923,096 | Kelley et al. | Aug. 22, 1933 |
| 2,167,013 | Unger et al. | July 25, 1939 |
| 2,771,075 | Haskin | Nov. 20, 1956 |

FOREIGN PATENTS

| | | |
|---|---|---|
| 160,589 | Switzerland | June 1, 1933 |
| 455,549 | Great Britain | Oct. 22, 1936 |